2,958,864
SLANT RANGE RATE MODIFICATION APPARATUS FOR RADAR TESTERS

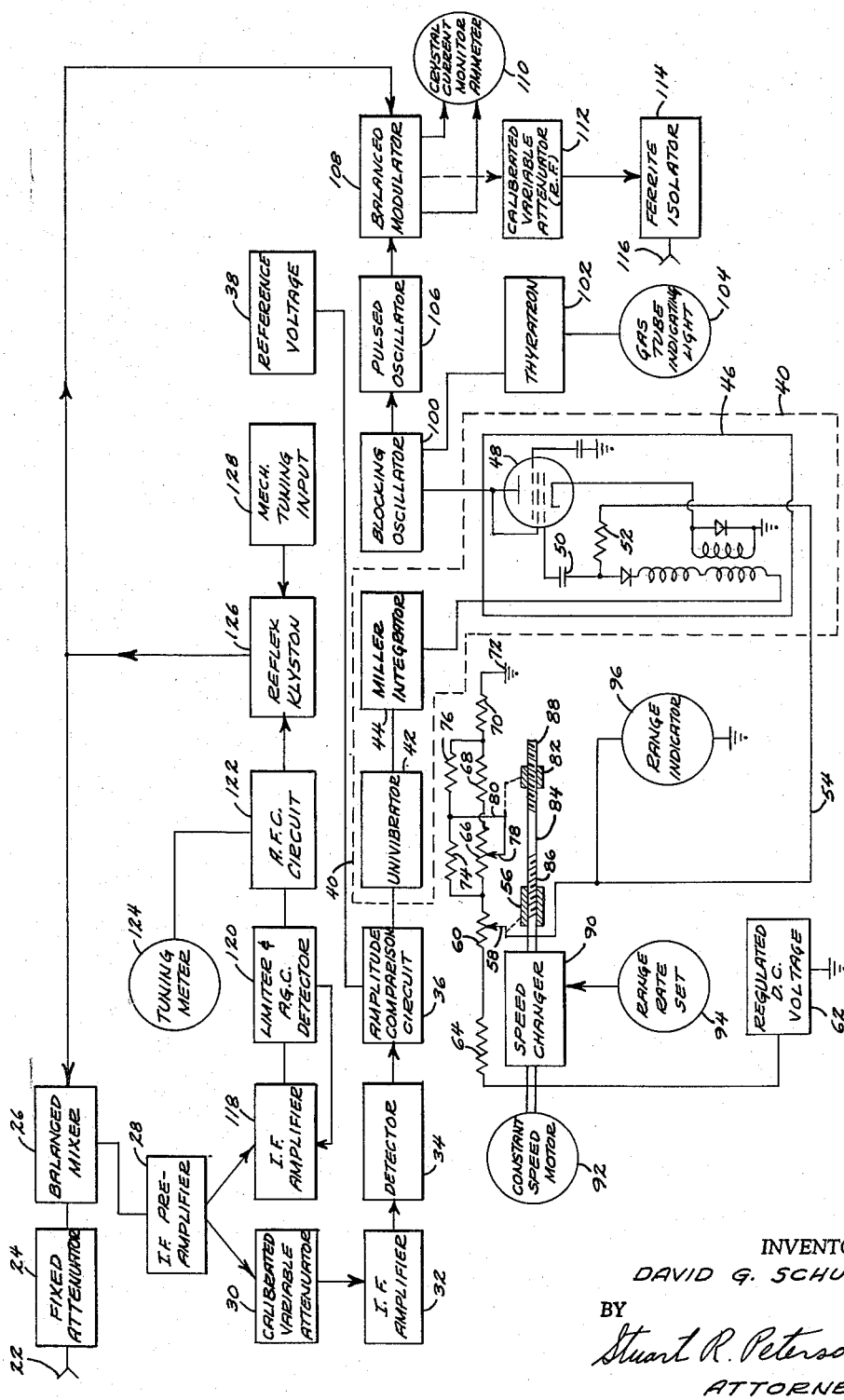

David G. Schulz, Minneapolis, Minn., assignor to General Mills, Inc., a corporation of Delaware Filed Oct. 15, 1957, Ser. No. 690,281

2 Claims. (Cl. 343—17.7)

This invention relates generally to radar testing equipment and pertains more particularly to slant range rate modification apparatus to be incorporated into such equipment.

The primary object of the present invention is to provide slant range rate modification apparatus which when added to a radar tester will permit the introduction of an appropriate signal to the radar testing equipment which will delay the signal returned to the radar set being tested in a preferred manner so as to simulate an approaching target flying at a particular altitude.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing the single figure is a schematic representation partly in block form and partly diagrammatic of a radar tester having incorporated therein my slant range rate modification feature.

While reference may be had to a patent application filed December 12, 1955, Serial No. 552,578, for a radar tester, said application being assigned to the same assignee as the instant application, nonetheless sufficient information will herein be presented so that the invention may be understood for the most part without actual reference to said radar tester application. Accordingly certain details of said pending application will be repeated at this time in order to apprise the reader of the test system with which my invention will find especial utility.

Referring now in detail to the drawing, it will be assumed that the radar set to be tested is in the proximity of the equipment now to be described. With this in mind it can be stated that the radar tester depicted in the single figure includes an antenna 22 for receiving a radar pulse signal transmitted by the radar set undergoing test. The antenna 22 feeds its signal directly to a fixed attenuator 24 coupled to a balanced mixer 26. The balanced mixer is a standard type of either the hybrid T or short-slot variety. After attenuation, the radar pulse signal is mixed with a continuous wave output from an automatic frequency controlled local oscillator circuit to be described hereinafter. The local oscillator frequency is selected so that the output of the mixer 26 will be a forty megacycle intermediate frequency pulse, or more precisely, a train of such pulses which are fed to a gain-stable I.F. preamplifier 28.

The output from the preamplifier 28 is channelled in two directions as far as the circuitry of the radar tester is concerned. We will deal with one course at the present time, this course being by way of a calibrated variable attenuator designated by the numeral 30. More will be said later on concerning the duties of this attenuator; however at the present moment, it will be sufficient to say that the output from the variable attenuator 30 is fed to a second gain-stable I.F. amplifier strip 32. Both of the amplifiers 28 and 32 are conventional staggered-tuned amplifiers with additional gain-stability achieved by means of a special power supply which controls the plate and screen voltage in order to compensate for changes in the heater voltages. The signal then proceeds to a detector 34 whose output will be a pulse having a width equal to that of the radar signal pulse and of an amplitude proportional to the peak of the received radar signal.

It is actually the amplitude of the pulse produced by the detector 34 that we are primarily concerned with and in this regard it is to be explained that the amplitude of this detector video pulse is to be compared with a preset known reference voltage. To do this, the video pulse is fed to an amplitude comparison circuit 36 which is an amplitude discriminating circuit of the Multiar type in which the input video pulses as received from the detector produce a large output pulse by regenerative action when and only when the amplitude of the input pulse exceeds the fixed reference voltage. The discrimination level is, of course, within the linear operation of the I.F. amplifiers 28 and 32.

As indicated above, comparison is to be made of the video output pulse from the detector 34 with a reference voltage and the source or supply for this reference voltage has been indicated by the numeral 38. The value of the reference voltage, a D.C. voltage, is susceptible to variation according to circuit design considerations. In the present situation, however, the voltage will be assumed to be in the neighborhood of 1 to 1.5 volts. Assuming that we have selected 1.5 volts, the amplitude comparison circuit functions in a fashion such that it will generate its output pulse only when the incoming pulse amplitude exceeds the 1.5 volt reference voltage. Therefore, for detector pulses greater than the reference voltage, the amplitude comparison circuit pulse output will be available for further utilization.

Continuation with the description, it is to be pointed out that the output pulse generaed by he amplitude comparison circuit 36 is fed to a variable electronic delay circuit denoted generally by the reference numeral 40. This circuit 40 is composed of a univibrator 42, a Miller integrator 44, and a second Multiar circuit 46. Since we are only directly concerned with certain portions of the Multiar circuit 46, the components thereof have been schematically portrayed. Specific reference will now be made to the existence of a pentode 48 such as a 6AU6 vacuum tube, a capacitor 50 in circuit with the control grid of said tube 48 and a resistor 52 connected between the capacitor 50 and a conductor 54.

The conductor 54 has electrtical communication with circuitry for varying the bias applied to the control grid of the pentode tube 48 in a manner which simulates the desired slant range rate modification. In furtherance of this objective it will be observed that the conductor 54 is connected directly to a wiper arm 58 belonging to a potentiometer 60, the wiper arm 58 being carried by a threaded rider 56. The potentiometer 60 is connected to a regulated D.C. voltage source 62 via a resistor 64. The potentiometer 60 is also in circuit with a potentiometer 66, a resistor 68, and a resistor 70 connected to ground at 72. In shunt relationship with the potentiometer 66 and the resistor 68 is a first resistor 74 and a second resistor 76. The potentiometer 66 includes a wiper arm 78 having attached thereto a flexible conductor 80 leading to the juncture between the resistors 74 and 76. The wiper arm 78 is carried by a threaded rider 82.

At this time it will be explained that the threaded riders 56 and 82 encircle a threaded shaft 84, said shaft having a first threaded portion 86 and a second threaded portion 88. From the drawing, close inspection of the shaft 84 will reveal that the threaded portion 86 spirals in a reverse direction from the threaded portion 88. Thus, when the shaft 84 is rotated, the threaded riders 56 and 82 will move in opposite directions.

In the hereinbefore alluded to pending patent application, only the potentiometer 60 was utilized together with a fixed resistor attached to either end thereof, such as the resistors 64 and 70. Consequently the present invention adds the various resistors 68, 74, and 76 acting in conjunction with the potentiometer 66. Actually the potentiometer 60, as it was in the referred to application, is a linear one and the potentiometer 66 is also linear, but the operational effect of said potentiometer is rendered non-linear by reason of the additional resistors 68, 74, and 76 included in circuit therewith. Thus, the potentiometer 60 constitutes a linear potentiometer section, and the potentiometer 66 together with its associated resistors 68, 74 and 76 constitute a non-linear potentiometer section. The two foregoing potentiometer sections comprise a non-linear potentiometer means, since its overall electrical effect in the circuit is non-linear. By virtue of the several resistances included and referred to above, it can be stated that the resistance between the potentiometer 60 and the resistor 68 varies in a certain relationship. This relationship is as follows:

$$R_{60-68} = \frac{\varphi R_{66} + R_{74}}{\varphi R_{66} \times R_{74}} + \frac{[(1-\varphi) R_{66} + R_{68}] + R_{76}}{[(1-\varphi) R_{66} + R_{68}] \times R_{76}}$$

In the above paragraph $\varphi$ is proportional to the mechanical position of the wiper 78 of the potentiometer 66. Stated somewhat differently, $\varphi$ is the percentage of the distance the wiper 78 is from the juncture of the potentiometer 66 with the potentiometer 60 toward the juncture of the potentiometer 66 with the resistor 68. Owing to the ganging of the potentiometers 60 and 66 through the medium of the shaft 84 it can be appreciated that as the wiper 58 moves in a direction from the resistor 64 toward the potentiometer 66, the wiper 78 simultaneously moves in a direction from the resistor 68 toward the potentiometer 60. Actually what is derived is a voltage which he will arbitrarily call $e_0$ which is the voltage at the wiper arm 58 of the potentiometer 60, this voltage being proportional to $\sqrt{H^2 + R_g^2}$ where H is the simulated altitude and $R_g$ is the ground range.

To achieve this proportionality the shaft 84 is mechanically connected to a speed changer 90 which may assume a variety of constructions but suggestively it may constitute a conventional ball and disc integrator. The speed changer is in turn drivenly connected to a constant speed motor 92. Different range rates may be established by setting the speed changer to a preferred range. To accomplish this a calibrated dial 94 having a suitable adjustment is connected to the speed changer 90 so that the operator or technician may select the particular range rate that is desired for the radar set undergoing test. Hence the shaft 84 will be rotated at a constant speed for any given adjusted position of the range rate set 94. Also it is desired to indicate the range that is currently being employed during complete testing of a radar set and therefore a range indicator 96 which may be an appropriately calibrated volt meter is electrically connected to the conductor 54 and hence to the wiper arm 58. Since the voltage at the wiper arm 58 is representative of $\sqrt{H^2 + R_g^2}$, as mentioned above, it immediately follows that a meter capable of reading this voltage will be indicative of the slant range.

Having mentioned that the potential of the wiper arm 58 is instrumental in producing a delay simulating the slant range rate and having explained that this particular signal is delivered to the pentode vacuum tube 48 of the Multiar circuit 46, it will now be stated that this delay signal is fed to a blocking oscillator 100 capable of generating a pulse having a time duration responsive to that of the originally received radar pulse. The pulse generated by the blocking oscillator 100 serves two purposes, the first of which will now be dealt with. In this regard, it is to be noted that the output pulse from the oscillator 100 is fed to the grid of the gas tube 102, such as a thyratron, and in circuit with the thyratron tube 102 is a gas tube indicating light 104, such as an ordinary neon tube. The function of the thyratron 102, remembering that the blocking oscillator pulse output has a time duration approximating one microsecond, is to extend the conduction time of the indicating light 104 beyond this extremely short time period so that the indicating light will appear definitely visible to the human eye. The specific manner in which the indicating light is used is best reserved for discussion during a typical operational sequence so, accordingly, a more detailed explanation of the role played by this light will be given hereinafter.

As stated above, the blocking oscillator 100 produces an output pulse having a prescribed width, and the second use therefor is now to be mentioned. This pulse is fed, in addition to the thyratron tube 102, to a pulsed oscillator 106, the purpose of which is to produce a forty megacycle pulse having a prescribed pulse width which stems from the triggering pulse received from the blocking oscillator. This pulse from the oscillator 106 is fed to a balanced modulator 108 which is coupled to the local oscillator circuitry already mentioned but yet to be described. The balanced modulator, like the mixer 26, may be of the hybrid tee or short-slot variety.

To measure the power transmitted back to the radar set which is undergoing test there is employed a crystal current monitor microammeter 110 capable of indicating the current in the microwave energy coming out of the balanced modulator 108. Also coupled to the balanced modulator 108 is a calibrated variable attenuator 112 which passes the microwave energy to a ferrite isolator 114, the isolator 114 in turn being connected to a transmitting antenna 116. The function of the isolator 114 is to make certain that the energy to be transmitted to the radar set passes to the antenna 116 but at the same time that the antenna 116 is utilized only for transmission purposes and does not receive any signal transmitted by the radar set. Of course energy transmitted by the radar set is to be received by the antenna 22 and not the transmitting antenna 116 for if energy were received by the antenna 116, then the system would be disturbed to such an extent that it would not function properly. In other words, the isolator is unidirectional in character.

It will be remembered that the balanced mixer 26, through the medium of the gain stable I.F. amplifier 28, produces pulses that follow two courses, these pulses in traversing the second path being fed to another I.F. amplifier 118 and then to the limiter and automatic gain control detector unit 110. From the limiter and A.G.C. detector unit 120, the output is fed to an automatic frequency controlled circuit 122, which may be of the conventional Foster-Seeley discriminator type and which slaves the local oscillator frequency to the radar frequency during the test, providing, of course, that radar signals are received in a continuous manner. In order to ascertain when the A.F.C. circuit 122 is tuned, there is provided a tuning meter 124. If the A.F.C. circuit 122 is at the prescribed forty megacycle frequency, then, of course, there is no output from this circuit. However, if the frequency is either above or below, then a D.C. voltage of appropriate polarity is sent out depending as far as its magnitude is concerned upon the deviation in frequency from the desired forty megacycles.

At this point it might be explained that we have somewhat arbitrarily selected a local oscillator frequency of forty megacycles above whatever radar frequency is then being encountered, this frequency lending itself readily to practical utilization.

The fundamental or primary purpose of the klystron automatic tuning circuitry is to cause a 2K25 reflex klystron, or similar klystron, to operate at the peak of its "A" power mode and at a frequency which is in the center of the electronic linear frequency control characteristic for this tube where the zero or reference control frequency is prescribed by the operating conditions for the circuit. The klystron tube in this situation has been given the reference numeral 126 appearing only in block form. It might be mentioned that the second purpose for the tuning circuitry is to enable the operator to tune the klystron 126 to a center frequency which is displaced by the amount of the intermediate frequency from the frequency of the radar to be tested. It is the klystron 126 that produces the local oscillator frequency which is fed to both the balanced mixer 26 and the balanced modulator 108.

From the preceding description and orientation of the various parts comprising my apparatus, it is believed that the operation thereof will be readily apparent. However, a brief explanation of a typical operational sequence will unquestionably be of some help. Accordingly, we will assume that the reflex klystron tube 126 is in proper operation and that its output is being delivered to both the balanced mixer 26 and the balanced modulator 108. Hence, when a pulse signal is received from the radar set being tested via the antenna 22 and the fixed attenuator 24, the detector 34 is responsible for putting out a pulse having a magnitude proportional to the received radar pulse introduced into the tester, and if this pulse coming from the detector 34 is of sufficient magnitude, it will be larger than the reference voltage introduced by the source 38 so as to cause the amplitude comparison circuit 36 to emit a large output pulse by regenerative action when and only when the amplitude of the pulse from the detector 34 is in excess of the voltage supplied by the D.C. voltage source 38.

While the output pulse from the amplitude comparison circuit might be fed through a thyratron 44, nonetheless since other things are to be accomplished the pulse action is by way of the delay circuit 40 and the blocking oscillator 100. At any rate it is by virtue of a pulse coming from the circuit 36 that causes the thyratron tube 102 to be fired. Such an occurrence is instrumental in indicating that a pulse has been emitted owing to the energization of the light 104.

More important to a discussion of the instant invention is the role played by the potentiometers 60 and 66. For the sake of illustration it will be assumed that a simulated altitude of 30,000 feet is desired and with this in mind the resistance values of the resistors 68, 74, and 76 are chosen. To simulate other altitudes, the values of these resistors would be changed either by employing adjustable resistors or substituting other fixed resistors having the requisite ohmic values. For the exemplary 30,000 foot simulated altitude, the following resistive values might be mentioned:

| | Ohms |
|---|---|
| Resistor 60 | 20,000 |
| Resistor 64 | 25,000 |
| Resistor 66 | 20,000 |
| Resistor 68 | 20,000 |
| Resistor 70 | 2,000 |
| Resistor 74 | 5,000 |
| Resistor 76 | 5,000 |

Having adjusted the range rates set 94 to the desired range, it will be observed that the speed changer 90 is correspondingly adjusted so as to transform the speed derived from the constant speed motor 92 to a preferred rate. Inasmuch as the shaft 84 is directly connected to the speed changer, it will be appreciated that said shaft 84 rotates at the rate prescribed by the range rate set 94. Rotation of the shaft 84 causes the riders 56 and 82 to say, move toward each other and thereby constantly modify the resistance present in the potentiometers 60 and 66. Obviously this causes a change in potential at the wiper arm 58 which we have previously indicated as being $e_0$. By reason of the conductor 54 this potential is impressed upon the Multiar circuit 46. From the schematic representation of this circuit 46 it will be discerned that the signal is fed into said circuit 46 via the resistor 52 and the capacitor 50, which capacitor connects directly with the grid of the pentode tube 48. Without presenting a considerable amount of general detail, it will be stated that the univibrator 42 when actuated by a pulse from the amplitude comparison circuit 36, triggers and gates the Miller integrator 44 so as to produce a linear negative-going triangular voltage. Thus it is actually the net effect of the compared triangular voltage and the voltage $e_0$ that is applied to the grid of the pentode tube 48. This resultant voltage which is actually applied to said grid of the tube 48 triggers the tube 48 into a conductive state at the instant when the negative triangular voltage drops below the voltage $e_0$ supplied by the potentiometer 60. The time delay is thus set for each pulse received by the radar tester that is of sufficient magnitude so as to actuate the amplitude comparison circuit 36.

Once the second Multiar 46 has been triggered by virtue of a pulse transformer coupling (not disclosed) the blocking oscillator 100 is in turn actuated. The actuation of the blocking oscillator 100 does two things: (1) it pulses the 40 mc. oscillator 106 and (2) it fires the thyratron 102 so as to light the gas tube indicating light 104.

The pulsed oscillator 106, of course, influences the balanced modulator 108 so that a return radar signal is transmitted from the antenna 116 back to the radar set undergoing test. This particular transmission action is fully explained in the previously mentioned pending application and need not be elaborated upon at this time.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. Apparatus for introducing a slant range rate modification signal into the operation of a radar tester comprising in combination, means for receiving a radar signal from a radar set undergoing test, means for transmitting a radar signal back to said radar set, circuit means for delaying the transmission of said radar signal back to said radar set after receipt of a radar signal therefrom, and non-linear potentiometer means for controlling said circuit means to vary the delay interval thereof at a rate of speed simulating a target moving at a given elevation with respect to that at which the radar tester is located, said non-linear potentiometer means including a linear section and a non-linear section connected in series and means for adjusting said potentiometer sections so as to provide a control potential varying in relation to $\sqrt{H^2 + R_g^2}$ where H is the simulated altitude and $R_g$ is the ground range.

2. Apparatus in accordance with claim 1 in which said linear section constitutes a linear resistance portion and said non-linear section constitutes first, second, third and fourth linear resistance portions, said first and second portions being serially connected and said third and fourth portions being serially connected with the first and second portions paralleling said third and fourth portions, a wiper arm electrically connected to the juncture of said first and second resistance portions in wiping engagement with said third resistance portion and a wiper arm in wiping engagement with said linear section resistance, and means for moving said wiper arms in a proper direction and at a preferred rate of speed so that said last-mentioned wiper arm will provide said control potential.

References Cited in the file of this patent

UNITED STATES PATENTS

| | | |
|---|---|---|
| 2,438,888 | Andrews et al. | Apr. 6, 1948 |
| 2,438,940 | Pennoyer | Apr. 6, 1948 |
| 2,477,485 | Jacob | July 26, 1949 |
| 2,549,473 | Jacob | Apr. 17, 1951 |
| 2,669,033 | Brown | Feb. 16, 1954 |

OTHER REFERENCES

Birtley: "Computer Simulates Moving Radar Targets"; Electronics, September 1953 (pp. 137–139 relied on).